(12) United States Patent
Kim

(10) Patent No.: US 7,715,122 B2
(45) Date of Patent: May 11, 2010

(54) WIDE-ANGLE ZOOM OPTIC SYSTEM

(75) Inventor: Jin-woo Kim, Seongnam-si (KR)

(73) Assignee: Samsung Digital Imaging Co., Ltd., Suwon-si (KR)

( * ) Notice: Subject to any disclaimer, the term of this patent is extended or adjusted under 35 U.S.C. 154(b) by 34 days.

(21) Appl. No.: 12/217,057

(22) Filed: Jul. 1, 2008

(65) Prior Publication Data

US 2009/0086332 A1 Apr. 2, 2009

(30) Foreign Application Priority Data

Oct. 1, 2007 (KR) .................. 10-2007-0098946

(51) Int. Cl.
*G02B 9/14* (2006.01)
(52) U.S. Cl. ..................................... 359/786
(58) Field of Classification Search ............... 359/676, 359/708, 786
See application file for complete search history.

(56) References Cited

U.S. PATENT DOCUMENTS 5,721,642 A * 2/1998 Shibayama et al. ......... 359/686
6,124,984 A * 9/2000 Shibayama et al. ......... 359/689
6,259,508 B1 * 7/2001 Shigematsu .................. 355/53

FOREIGN PATENT DOCUMENTS

| JP | 2001-042218 A | 2/2001 |
| JP | 2005-196621 A | 7/2005 |
| JP | 2007-102182 A | 4/2007 |
| JP | 2007-108531 A | 4/2007 |

\* cited by examiner

*Primary Examiner*—Joseph Martinez
(74) *Attorney, Agent, or Firm*—Drinker Biddle & Reath LLP

(57) ABSTRACT

A wide-angle zoom optic system includes: in an order from an object, a first lens group having a negative refractive power; a second lens group having a positive refractive power; and a third lens group having a positive refractive power, wherein the first lens group includes two lens elements. In the zoom optic system, the ratio of the distance between the last lens element with respect to the object and an image field at a wide-angle position to a focal length at the wide-angle position is adjusted, so that a compact zoom optic system having a high magnification and a wide viewing angle can be implemented.

20 Claims, 12 Drawing Sheets

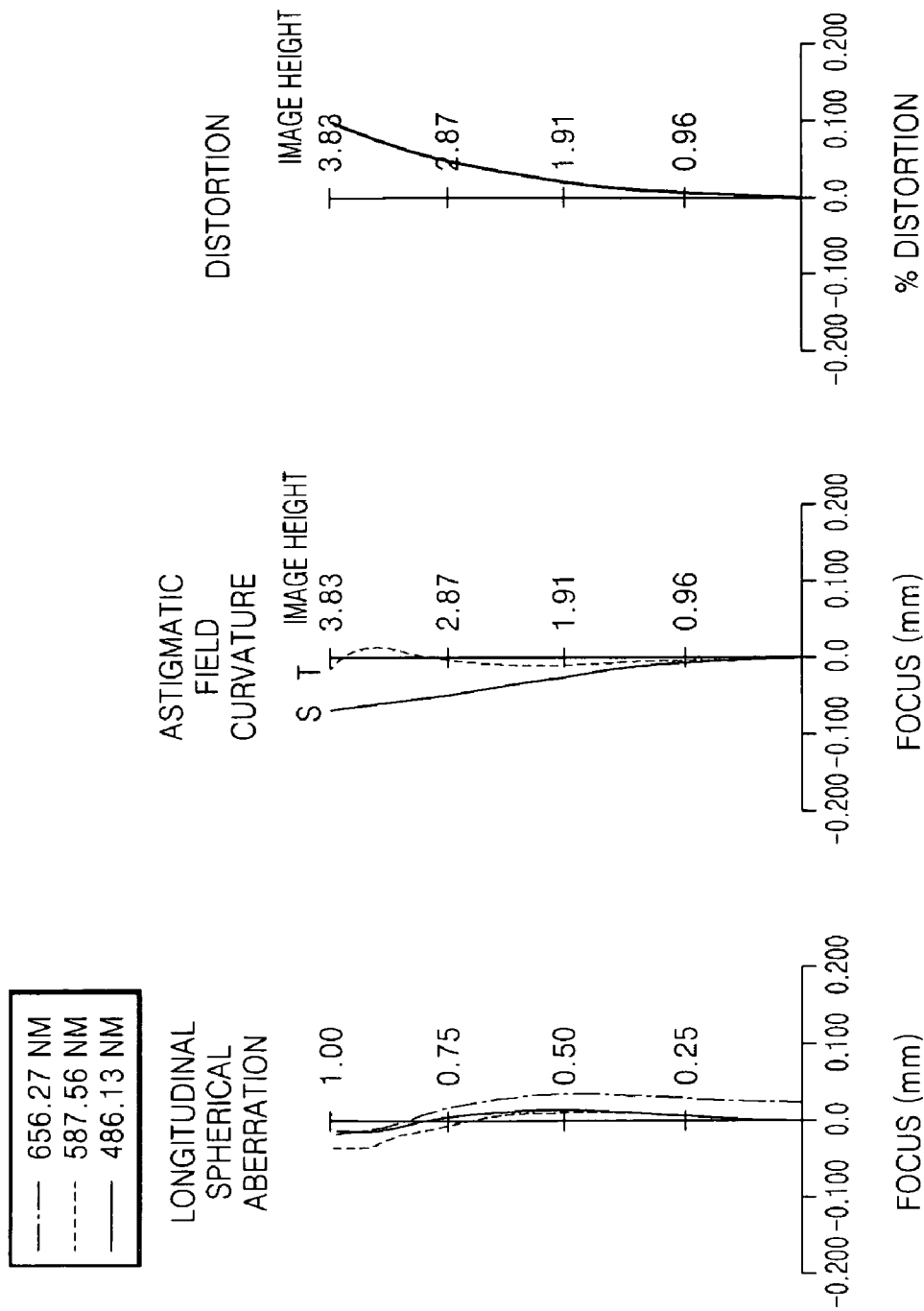

(WIDE-ANGLE END)

(MIDDLE-ANGLE END)

(TELEPHOTO END)

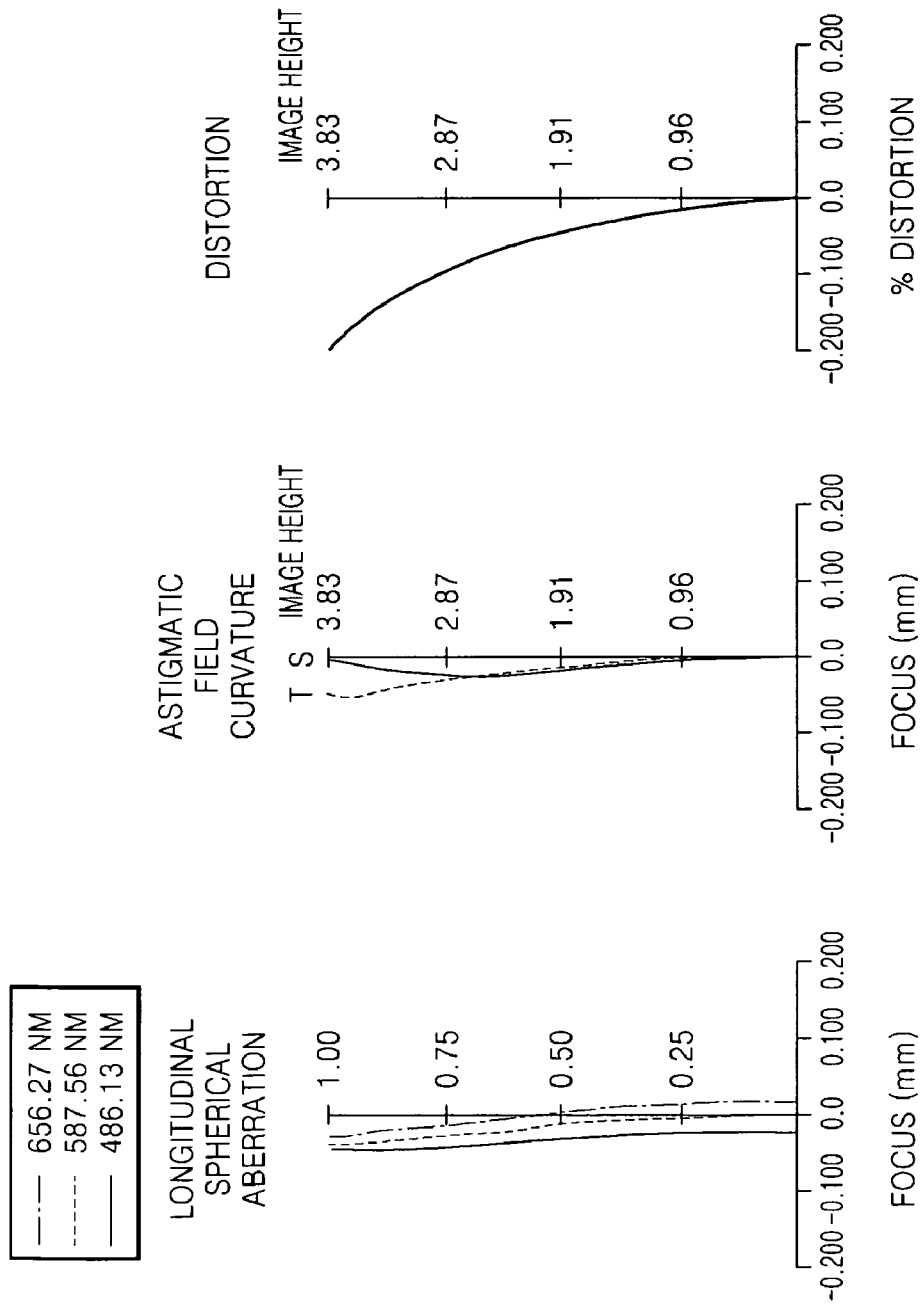

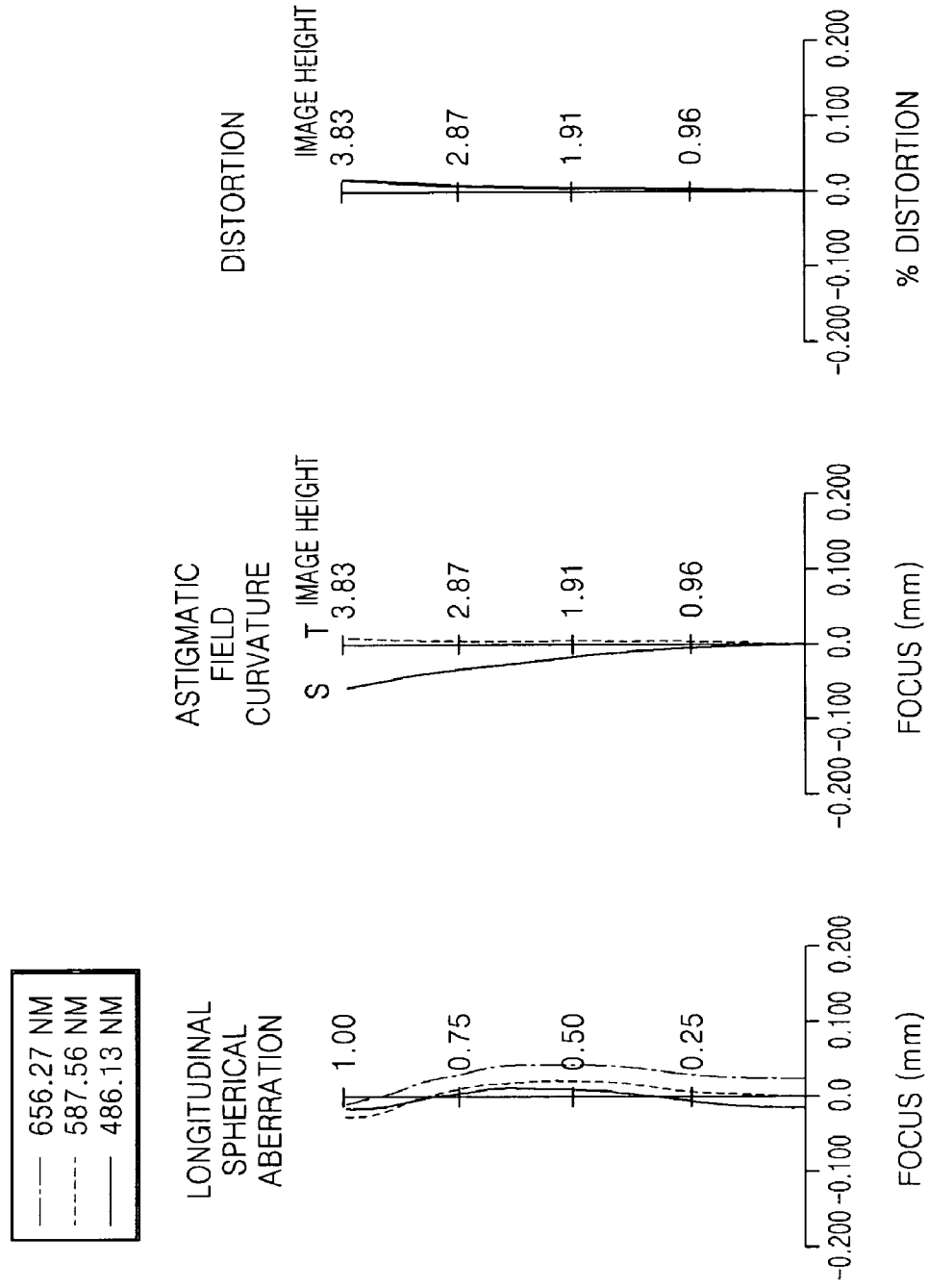

WIDE-ANGLE ZOOM OPTIC SYSTEM

CROSS-REFERENCE TO RELATED PATENT APPLICATION

This application claims the benefit of Korean Patent Application No. 10-2007-0098946, filed on Oct. 1, 2007, in the Korean Intellectual Property Office, the disclosure of which is incorporated herein in its entirety by reference.

BACKGROUND OF THE INVENTION

1. Field of the Invention

The present invention relates to a wide-angle zoom lens system suitable for a camera using a solid-state image pickup device, and more particularly to, an inexpensive compact wide-angle zoom lens system having a wide field of view and high magnification.

2. Description of Related Art

Recently, image pickup apparatuses using an image pickup device such as a charge coupled device (CCD) and a complementary metal oxide semiconductor (CMOS), for example, digital cameras and digital camcorders, have been widely used. High performance such as high magnification and a wide viewing angle has been required for the image pickup apparatuses. In addition, there is a demand for inexpensive compact image pickup apparatuses. Accordingly, there is also a demand for inexpensive high-performance compact zoom lenses.

A zoom optic system disclosed in Japanese Patent Application Publication No. 2007-108531 includes first to third lens groups having negative, positive, and positive refractive power respectively, in that order from an object. In the zoom optic system, although a wide viewing angle of 80° or more can be obtained, a magnification has a low value of less than 3. In addition, since the first lens group is constructed with three lenses, it is unsatisfactory for compactness.

A zoom optic system disclosed in Japanese Patent Application Publication No. 2007-102182 includes first to third lens groups having negative, positive, and positive refractive power, respectively. At the telephoto position, the first and second lens groups are moved so as to shorten the distance between the first and second lens groups and lengthen the distance between the second and third lens groups. The zoom optic system has a high magnification of 3 to 4 but a narrow viewing angle of 70° or less.

A zoom optic system disclosed in Japanese Patent Application Publication No. 2005-196621 includes first to fifth lens groups having positive, negative, positive, positive, and positive refractive power, respectively. During image-field shifting from wide-angle to telephoto, the first to fourth lens groups are moved, and the fifth lens is fixed. A partial lens group of the third lens group is designed as a shift lens group. By shifting the partial lens group in a direction substantially perpendicular to an optical axis direction, the image field can be shifted. In this zoom optic system, a high magnification of 7 and a wide viewing angle of 75° or more can be obtained. However, the construction of lenses is complicated and since the zoom optic system has five lens groups, there is a disadvantage in that the lens barrel needs to be large.

A zoom optic system disclosed in Korean Patent Application Publication No. 2001-042218 includes first to third lens groups having negative, positive, and positive refractive power, respectively. During image-field shifting from wide-angle to telephoto, the first and second lens groups are moved and the third lens group is fixed, so that the distance between the first and second lens groups is shortened and the distance between the second and third lens groups is lengthened. However, since the zoom optic system is constructed with six lens groups, there is a disadvantage in terms of an increase in cost.

SUMMARY OF THE INVENTION

The present invention provides a compact zoom optic system having a high magnification and wide viewing angle.

According to an aspect of the present invention, there is provided a zoom optic system comprising: in an order from an object side, a first lens group having a negative refractive power; a second lens group having a positive refractive power; and a third lens group having a positive refractive power, wherein the first lens group is constructed with two lenses, wherein the condition $1.1 \leq f_b/f_w \leq 1.6$ is satisfied, and wherein $f_b$ is the distance between the lens element closest to the object side and the image surface at a wide-angle position, and $f_w$ is the focal length at the wide-angle position.

According to another aspect of the present invention, there is provided a zoom optic system comprising: in an order from an object side, a first lens group having a negative refractive power; a second lens group having a positive refractive power; and a third lens group having a positive refractive power, wherein the first lens group is constructed with two lenses, wherein the condition $76° \leq \text{wfov} \leq 86°$ is satisfied, and wherein the wfov is a viewing angle in a wide-angle end.

BRIEF DESCRIPTION OF THE DRAWINGS

The above and other features and advantages of the present invention will become more apparent by describing in detail exemplary embodiments thereof with reference to the attached drawings in which:

FIGS. 2A and 2B illustrate the longitudinal spherical aberration, astigmatic field curvature, and distortion aberration at wide-angle and telephoto positions of the zoom optic system according to the first embodiment;

FIGS. 6A and 6B illustrate the longitudinal spherical aberration, astigmatic field curvature, and distortion aberration at wide-angle and telephoto positions of the zoom optic system according to the third embodiment;

FIGS. 8A and 8B illustrates the longitudinal spherical aberration, astigmatic field curvature, and distortion aberration at wide-angle and telephoto positions of the zoom optic system according to the fourth embodiment.

DETAILED DESCRIPTION OF THE INVENTION

Figure 1:
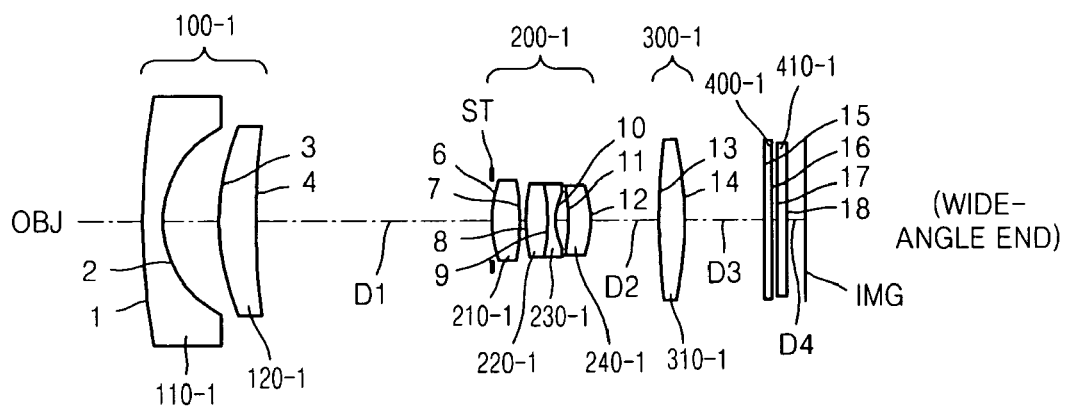
FIG. 1 illustrates optical layouts at wide-angle, middle-angle, and telephoto positions of a zoom optic system according to a first embodiment of the present invention.
Figure 1:
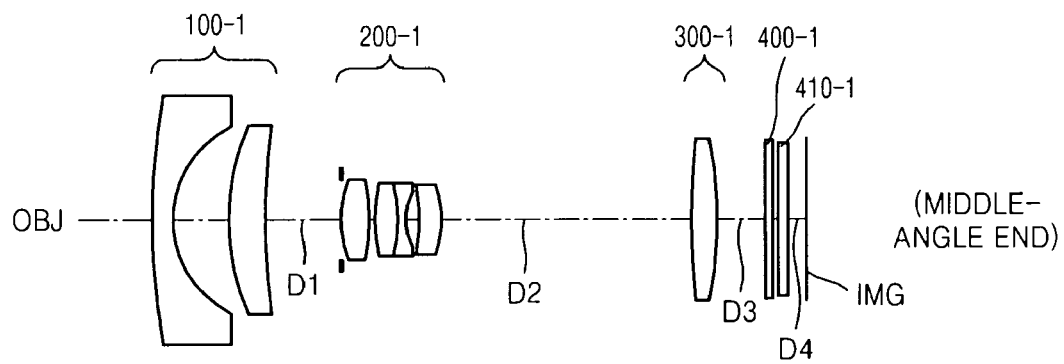
Figure 1:
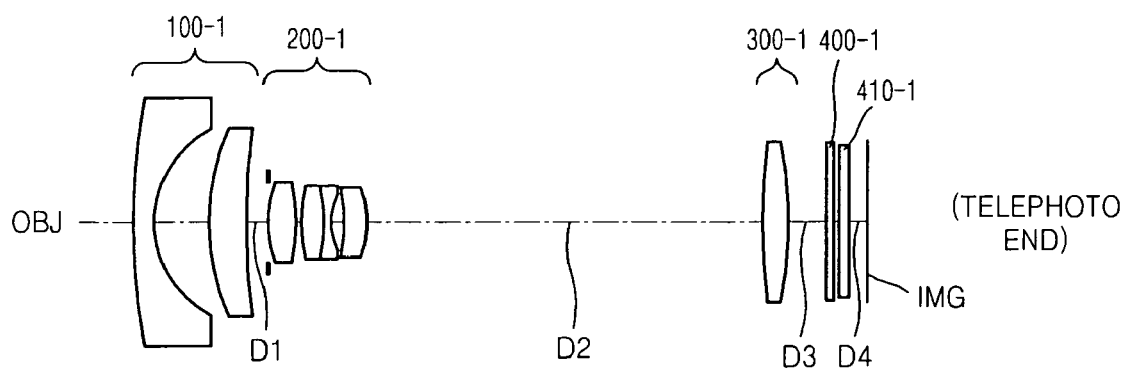

The present invention will now be described more fully with reference to the accompanying drawings, in which exemplary embodiments of the invention are shown. In the accompanying drawings, shapes and sizes of elements may be exaggerated for clarifying the present invention, and like reference numerals denote like elements.

Referring to FIG. 1, the zoom optic system includes a first lens group 100-1 having a negative refractive power, a second lens group 200-1 having a positive refractive power, and a third lens group 300-1 having a positive refractive power.

The magnification of the zoom optic system according to the present invention satisfies Equation 1.

$$3.0 \leq f_t/f_w \leq 4.0 \quad \text{[Equation 1]}$$

Here, $f_w$ is the focal length at the wide-angle position, and $f_t$ is a focal length in the telephoto position.

In the zoom optic system according to the present invention, in order to provide a wide viewing angle, the focal length at the wide-angle position compared to the back focal length is limited to a small value as follows.

$$1.1 \leq f_b/f_w \leq 1.6 \quad \text{[Equation 2]}$$

Here, $f_b$ is the distance between the lens element closest to the object side and the image surface at the wide-angle position, and $f_w$ is the focal length at the wide-angle position.

In other words, according to Equation 2, the ratio of the distance between the last lens and the solid-state image pickup device to the focal length at the wide-angle position is limited. The image surface IMG is an imaging surface of a solid-state image pickup device of the lens system. An infrared (IR) filter 400-1 and an optical low-pass filter (OLPF) may be disposed between the solid-state image pickup device and the lens system. In order to compensate for a focusing error of the lens module, the distance between the last lens of the lens system and the sold-state image pickup device is designed to be relatively large. The wide viewing angle can be obtained based on Equation 2 by increasing the distance between the last lens of the lens system and the solid-state image pickup device or decreasing the ratio of the distance between the last lens of the lens system and the solid-state image pickup device to the focal length at the wide-angle position. If the ratio deviates from the range of Equation 2, the distance between the last lens of the lens system and the solid-state image pickup device is so small that it is difficult to design the focusing mechanism and other elements.

In addition, the zoom optic system according to the present invention satisfies Equation 3.

$$76° \leq wfov \leq 86° \quad \text{[Equation 3]}$$

Here, wfov is a viewing angle at the wide-angle position.

If the viewing angle at the wide-angle position is more than about 85°, the lens system exhibits a large deformation of an image of an object like a fish-eye lens. Therefore, the range of the viewing angle wfov at the wide-angle position is important for providing a wide viewing angle and also for maintaining the image of the object to be substantially equal to an actual shape of the object. In the lens system satisfying the range of Equation 3, an image for a wide landscape and an image for a large number of objects in a narrow field can be picked up.

Now, the characteristics of the lenses will be described in detail.

The first lens group 100-1 includes two lens elements, for example, a first lens element 110-1 disposed closer to the object side and having a negative refractive power and a second lens element 120-1 disposed closer to the image side and having a positive refractive power. Since the first lens group 100-1 includes two lens elements, the size and cost of the zoom optical system can be reduced. Preferably, in order to obtain the desired refractive power for a wide-angle optical system, the two lens elements may have an aspherical surface. In addition, preferably, in order to implement the wide-angle optical system, the positive lens element 120-1, may have a large refractive power. For example, the positive lens element 120-1 may have a refractive index $N_d$ satisfying Equation 4.

$$N_d \geq 1.9 \quad \text{[Equation 4]}$$

For example, the second lens element 120-1 may be made of a material having a refractive index of 1.9 or more. This is because it is difficult to obtain a viewing angle of 76° or more by using a material having a lower refractive index, such as about 1.8.

The second lens group 200-1 includes four lens elements and therefore, provides the desired magnification. More specifically, the second lens group 200-1 includes a first lens element 210-1 having a positive refractive power, a second lens element 220-1 having a positive refractive power, a third lens element 230-1 having a negative refractive power, and a fourth lens element 240-1 having a positive refractive power. This construction is employed in order to easily control aberration. The second and third lens elements 220-1 and 230-1 constitute a cemented lens group so as to compensate for chromatic aberration. In addition, in order to easily control the chromatic aberration, at least one of the four lens elements of the second lens group 200-1 is designed to have an Abbe value $V_d$ satisfying Equation 5.

$$V_d \geq 80 \quad \text{[Equation 5]}$$

If a material having an Abbe value of less than 80 is used to compensate for the chromatic aberration, the number of lens elements needs to be increased. In order to avoid the problem of an increase in the number of lens elements, a low dispersive material having an Abbe value of 80 or more is used.

In addition, at least one of the four lens elements of the second lens group 200-1 is designed to have an aspherical surface. The iris diaphragm ST is designed to cooperate with the second lens group 200-1. By forming a surface of the lens adjacent to the iris diaphragm ST as an aspherical surface, it is possible to easily compensate for spherical aberration.

The second lens group 200-1 may be formed as a shift lens group which can move in a direction perpendicular to the optical-axis direction. This construction is employed in order to compensate for hand blur, i.e., a blurring of a picture caused by a hand movement of a camera operator. Therefore, the second lens group 200-1 needs to be designed so that a good quality of image and a good compensation of spherical aberration and Petzval sum can be obtained during the shifting of lenses. Accordingly, it is preferable that one or more surfaces of the lens elements of the second lens group 200-1 is formed as an aspherical surface and aberration control is performed by taking into consideration de-centering caused by the hand blur. Due to this construction, it is possible to suppress the spherical aberration and eccentricity coma aberration occurring at the center of an image during the shifting of lenses in the direction perpendicular to the optical-axis direction. In addition, due to the compensation of the Petzval sum, it is possible to suppress the astigmatic field curvature occurring at the edges of an image during the shifting of lenses.

The third lens group 300-1 may include a lens element 310-1, for example, having a positive refractive power.

Now, data of the lenses of wide-angle zoom optical systems according to various embodiments of the present invention will be described. In the embodiments of the present invention, asphericity ASP is defined by Equation 6.

$$x = \frac{c'y^2}{1+\sqrt{1-(K+1)c'^2y^2}} + Ay^4 + By^6 + Cy^8 + Dy^{10} \quad \text{[Equation 6]}$$

Here, the x is a distance from a vertex of a lens in an optical-axis direction, and the y is a distance in a direction perpendicular to the optical-axis direction. The K denotes a conic constant, and the A, B, C, and D denote aspherical coefficients. The c' denotes a reciprocal of the radius of curvature, 1/R, at the vertex of the lens.

Hereinafter, EFL denotes a combined focal length of an entire zoom optical system, and FNo denotes an F number thereof. In addition, ST denotes an iris diaphragm, and D1 to D4 denote variable distance between lenses in the first to fourth embodiments. Reference numerals of elements or components are attached with the numbers indicating the first to fourth embodiments.

FIRST EMBODIMENT

FIG. 1 illustrates wide-angle zoom lens according to a first embodiment. Referring to FIG. 1, a first lens group 100-1 includes a first lens element 110-1 and a second lens element 120-1, a second lens group 200-1 includes first, second, third and fourth lens elements 210-1 to 240-1, and a third lens group 300-1 includes a lens element 310-1. Reference numeral 400-1 denotes an IR filter, and reference numeral 410-1 denotes a cover glass. Data of the lenses according to the first embodiment are as follows.

EFL: 4.41 mm~15.07 mm, FNo: 2.88~5.99, Viewing Angle: 84.8°·28.0°

TABLE 1

| Plane | Radius of Curvature | Thickness | Refractive Index ($N_d$) | Abbe's Number ($V_d$) |
|---|---|---|---|---|
| 1 | 47.875 | 1.000 | 1.801 | 45.4 |
| 2 | 4.525 | 2.789 | | |
| 3 | 11.926 | 1.788 | 1.997 | 20.6 |
| 4 | 24.170 | D1 | | |
| ST | infinity | 0.000 | | |
| 6 | 5.761 | 1.337 | 1.806 | 40.7 |
| 7 | −82.387 | 0.307 | | |
| 8 | 13.445 | 1.106 | 1.488 | 70.4 |
| 9 | −12.623 | 0.430 | 1.755 | 27.5 |
| 10 | 4.892 | 0.522 | | |
| 11 | −20.995 | 1.218 | 1.497 | 81.6 |
| 12 | −5.587 | D2 | | |
| 13 | 27.698 | 1.352 | 1.583 | 59.5 |
| 14 | −19.319 | D3 | | |
| 15 | infinity | 0.300 | 1.517 | 64.2 |
| 16 | infinity | 0.500 | | |
| 17 | infinity | 0.500 | 1.517 | 64.2 |
| 18 | infinity | D4 | | |

Table 2 lists aspherical coefficients of the zoom lenses according to the first embodiment.

TABLE 2

| Plane | K | A | B | C | D |
|---|---|---|---|---|---|
| 1 | −447.448783 | 6.310866E−04 | −1.907164E−05 | 2.507439E−07 | −1.585188E−09 |
| 2 | −1.907141 | 1.960890E−03 | 6.161278E−06 | −1.105370E−06 | 0.000000E+00 |
| 4 | 17.866850 | −3.078708E−04 | −4.167740E−06 | −7.845672E−08 | 5.424553E−10 |
| 6 | −0.305681 | −1.545893E−04 | −7.342949E−06 | 0.000000E+00 | 0.000000E+00 |
| 7 | 300.000000 | 5.456324E−04 | −2.622744E−05 | 1.371130E−06 | 0.000000E+00 |
| 13 | 28.322051 | −3.957640E−04 | −1.717886E−06 | −2.879350E−07 | 0.000000E+00 |

Table 3 lists variable distances D1 to D4 at the wide-angle, middle-angle, and telephoto positions of the wide-angle zoom lenses according to the first embodiment.

TABLE 3

| | WIDE | MIDDLE | TELE |
|---|---|---|---|
| D1 | 11.710 | 3.760 | 1.034 |
| D2 | 3.439 | 12.510 | 19.695 |
| D3 | 4.436 | 2.913 | 2.412 |
| D4 | 0.370 | 0.370 | 0.370 |

Figure 2A:
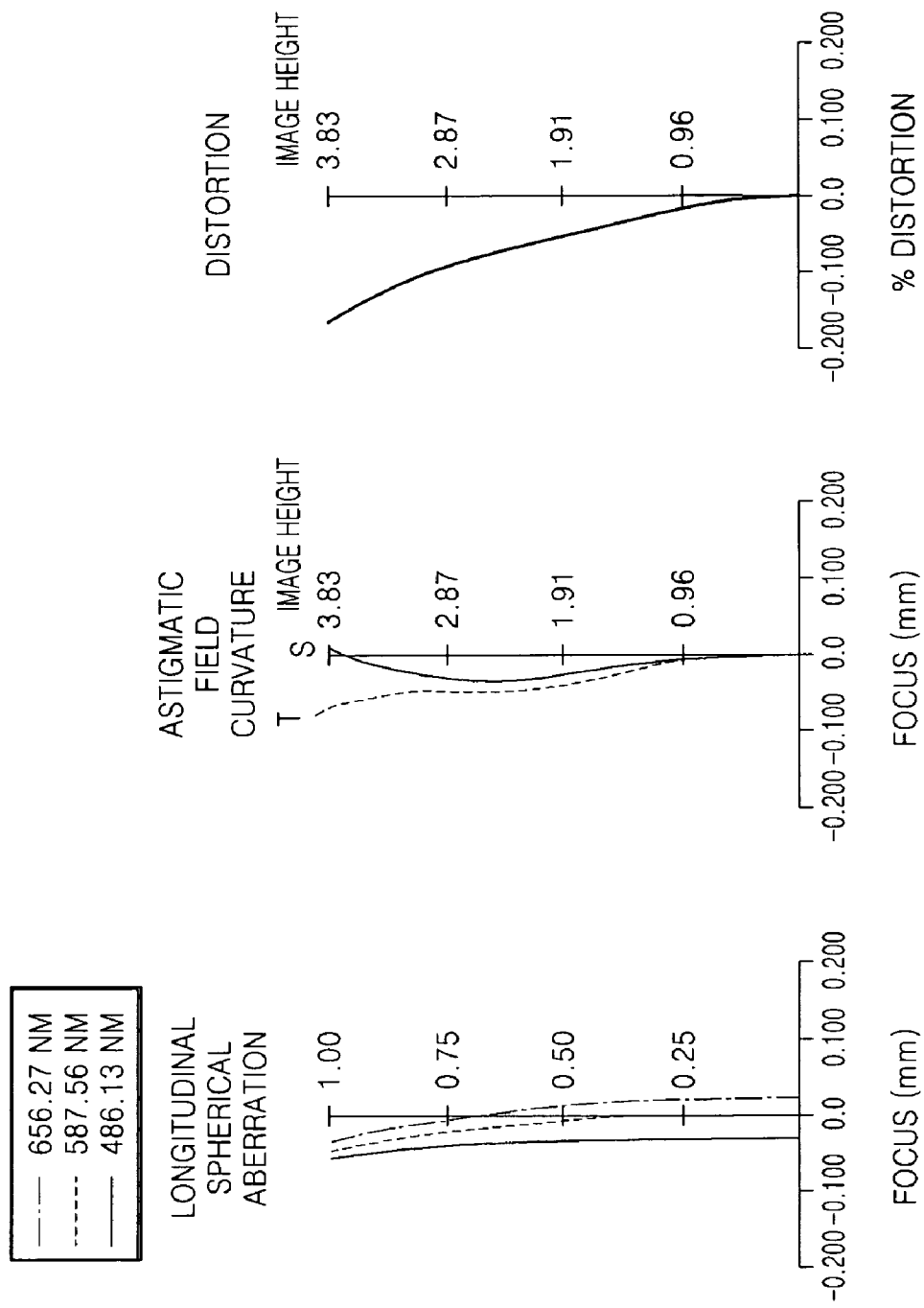

FIGS. 2A and 2B illustrate longitudinal spherical aberration, astigmatic field curvature, and distortion aberration at the wide-angle and telephoto positions of the wide-angle zoom lens according to the first embodiment. The longitudinal spherical aberration is measured by using light beams with wavelengths of 656.27 nm, 587.56 nm, and 486.13 nm. The astigmatic field curvatures including tangential field curvatures T and sagittal field curvature S are measured by using the light beam with a wavelength of 587.56 nm. The distortion aberration is measured by using the light beam with a wavelength of 587.56 nm.

SECOND EMBODIMENT

Figure 3:
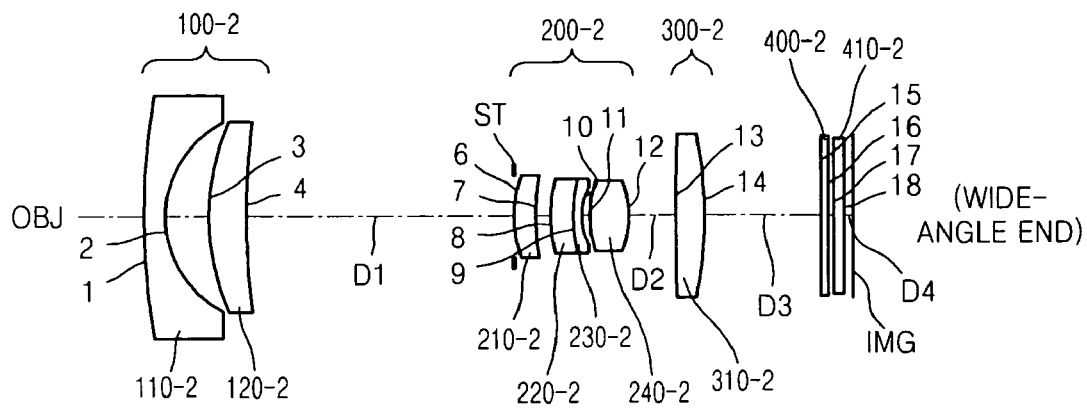
FIG. 3 illustrates optical layouts at wide-angle, middle-angle, and telephoto positions of a zoom optic system according to a second embodiment of the present invention.
Figure 3:
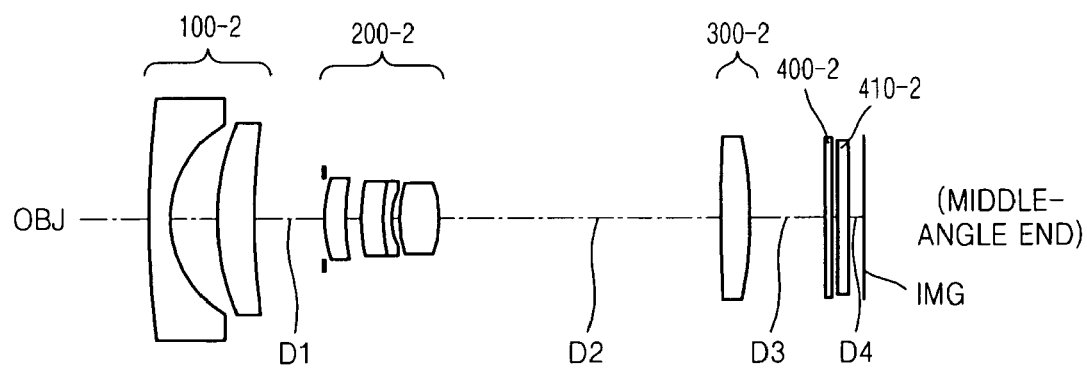
Figure 3:
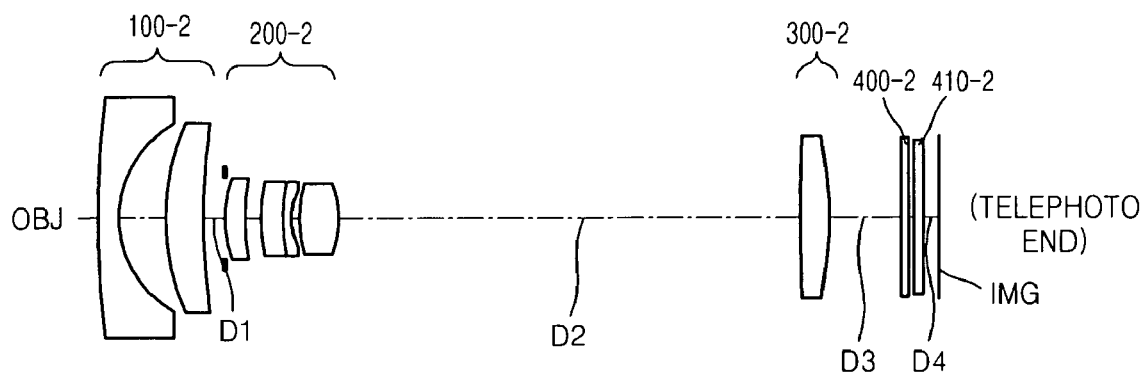

FIG. 3 illustrates the wide-angle zoom lens according to a second embodiment. Referring to FIG. 3, a first lens group 100-2 includes a first lens element 110-2 and a second lens element 120-2, a second lens group 200-2 includes first, second, third and fourth lens elements 210-2 to 240-2, and a third lens group 300-2 includes a lens element 310-2. Reference numeral 400-2 denotes an IR filter, and reference numeral 410-2 denotes a cover glass. Data of the lenses according to the second embodiment are as follows.

EFL: 4.59 mm~18.36 mm, FNo: 2.90~6.89, Viewing Angle: 82.6°~23.1°

TABLE 4

| Plane | Radius of Curvature | Thickness | Refractive Index ($N_d$) | Abbe's Number ($V_d$) |
|---|---|---|---|---|
| 1 | 75.967 | 1.000 | 1.806 | 40.7 |
| 2 | 4.440 | 2.264 | | |
| 3 | 10.641 | 1.876 | 1.995 | 20.7 |
| 4 | 25.104 | D1 | | |
| ST | infinity | 0.000 | | |
| 6 | 5.929 | 1.165 | 1.806 | 40.7 |
| 7 | 15.835 | 0.715 | | |
| 8 | 8.891 | 1.179 | 1.488 | 70.4 |
| 9 | 152.882 | 0.450 | 1.755 | 27.5 |
| 10 | 5.090 | 0.310 | | |
| 11 | 12.566 | 1.751 | 1.456 | 90.3 |
| 12 | −8.278 | D2 | | |
| 13 | 51.914 | 1.491 | 1.583 | 59.5 |

TABLE 4-continued

| Plane | Radius of Curvature | Thickness | Refractive Index ($N_d$) | Abbe's Number ($V_d$) |
|---|---|---|---|---|
| 14 | −21.567 | D3 | | |
| 15 | infinity | 0.300 | 1.517 | 64.2 |
| 16 | infinity | 0.500 | | |
| 17 | infinity | 0.500 | 1.517 | 64.2 |
| 18 | infinity | D4 | | |

Table 5 lists aspherical coefficients of the zoom lenses according to the second embodiment.

TABLE 5

| Plane | K | A | B | C | D |
|---|---|---|---|---|---|
| 2 | −1.123000 | 5.747577E−04 | −1.721121E−06 | 2.146482E−07 | 0.000000E+00 |
| 3 | 0.285322 | 2.164473E−05 | 2.489323E−06 | 4.309550E−08 | 0.000000E+00 |
| 4 | 11.688304 | −1.565905E−04 | 6.233055E−06 | −1.944943E−07 | 0.000000E+00 |
| 6 | −0.449303 | −1.511081E−04 | 3.145802E−06 | 0.000000E+00 | 0.000000E+00 |
| 13 | 110.841601 | −3.223468E−04 | 3.519385E−06 | −2.960821E−07 | 0.000000E+00 |

Table 6 lists variable distances D1 to D4 at the wide-angle, middle-angle, and telephoto positions of the wide-angle zoom lens according to the second embodiment.

TABLE 6

|  | WIDE | MIDDLE | TELE |
|---|---|---|---|
| D1 | 13.370 | 3.493 | 0.700 |
| D2 | 2.542 | 14.288 | 23.501 |
| D3 | 5.895 | 4.207 | 4.097 |
| D4 | 0.370 | 0.370 | 0.370 |

Figure 4A:
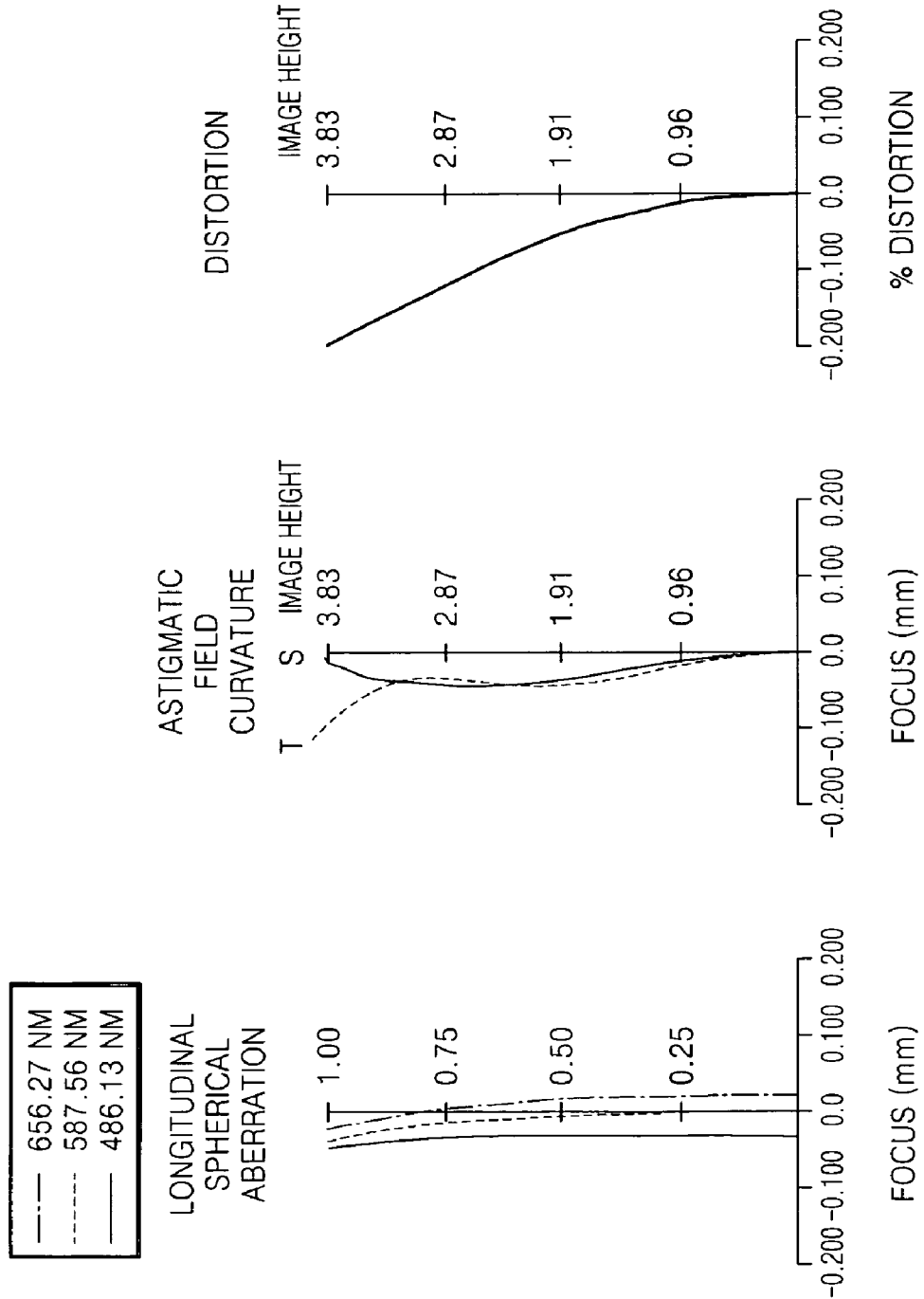
FIGS. 4A and 4B illustrates the longitudinal spherical aberration, astigmatic field curvature, and distortion aberration at wide-angle and telephoto positions of the zoom optic system according to the second embodiment.
Figure 4B:
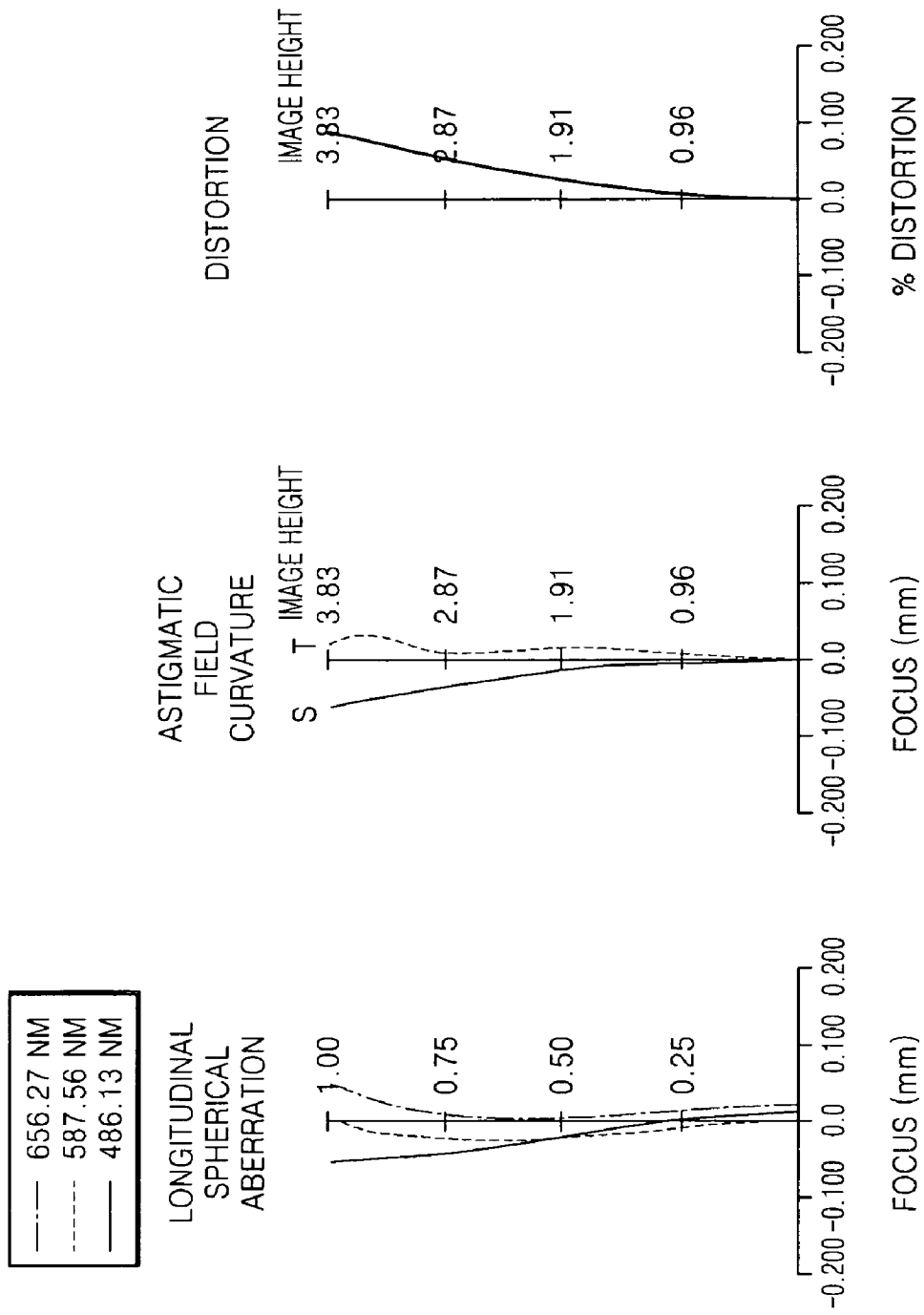

FIGS. 4A and 4B illustrate longitudinal spherical aberration, astigmatic field curvature, and distortion aberration at the wide-angle and telephoto positions of the wide-angle zoom lens according to the second embodiment. The longitudinal spherical aberration is measured by using light beams with wavelengths of 656.27 nm, 587.56 nm, and 486.13 nm. The astigmatic field curvatures including tangential field curvatures T and sagittal field curvature S are measured by using the light beam with a wavelength of 587.56 nm. The distortion aberration is measured by using the light beam with a wavelength of 587.56 nm.

TABLE 7

| Plane | Radius of Curvature | Thickness | Refractive Index ($N_d$) | Abbe's Number ($V_d$) |
|---|---|---|---|---|
| 1 | 24.211 | 1.000 | 1.801 | 45.5 |
| 2 | 4.300 | 3.073 |  |  |
| 3 | 10.954 | 1.645 | 1.959 | 19.7 |
| 4 | 18.354 | D1 |  |  |
| ST | infinity | 0.000 |  |  |
| 6 | 5.953 | 1.360 | 1.801 | 45.5 |
| 7 | −61.416 | 0.241 |  |  |
| 8 | 20.295 | 1.079 | 1.488 | 70.4 |
| 9 | −21.464 | 0.742 | 1.755 | 27.5 |
| 10 | 5.298 | 0.466 |  |  |
| 11 | −22.052 | 1.101 | 1.497 | 81.6 |
| 12 | −5.545 | D2 |  |  |
| 13 | 16.869 | 1.494 | 1.497 | 81.6 |
| 14 | −29.014 | D3 |  |  |
| 15 | infinity | 0.300 | 1.517 | 64.2 |
| 16 | infinity | 0.500 |  |  |
| 17 | infinity | 0.500 | 1.517 | 64.2 |
| 18 | infinity | D4 |  |  |

Table 8 lists aspherical coefficients of the zoom lenses according to the third embodiment.

TABLE 8

| Plane | K | A | B | C | D |
|---|---|---|---|---|---|
| 1 | −75.538206 | 6.049150E−04 | −1.818642E−05 | 2.324108E−07 | −1.378018E−09 |
| 2 | −1.853302 | 2.005570E−03 | 5.112481E−06 | −9.519311E−07 | 0.000000E+00 |
| 4 | 7.725961 | −2.825771E−04 | −6.434103E−06 | 1.640783E−08 | 6.567431E−10 |
| 6 | −0.172574 | −7.511896E−05 | 2.516684E−05 | 0.000000E+00 | 0.000000E+00 |
| 7 | −202.043049 | 6.487000E−04 | 3.382171E−05 | −1.025366E−06 | 0.000000E+00 |
| 13 | 9.167564 | −5.080443E−04 | 1.645976E−06 | −4.513021E−07 | 0.000000E+00 |

THIRD EMBODIMENT

Figure 5:
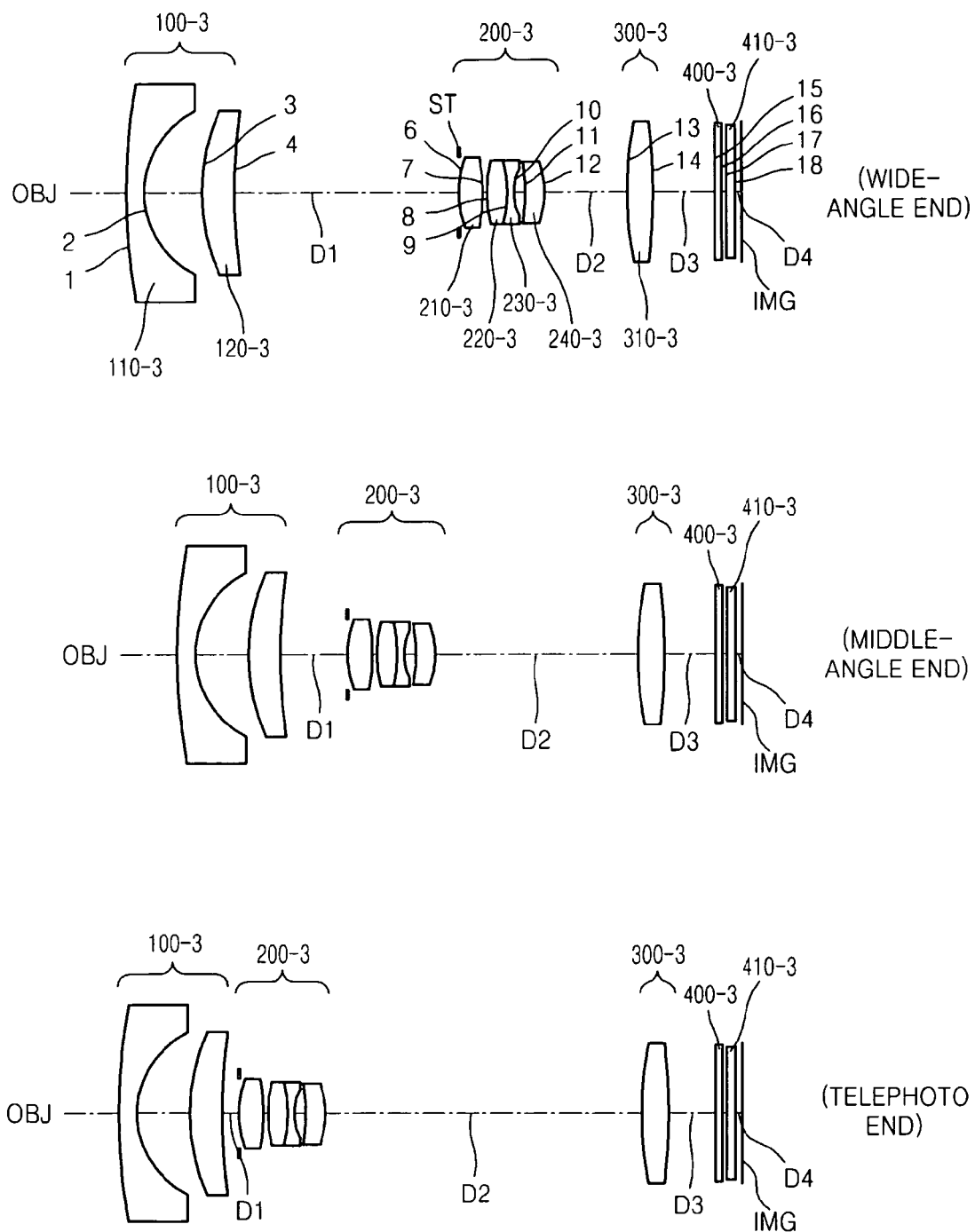
FIG. 5 illustrates optical layouts at wide-angle, middle-angle, and telephoto positions of a zoom optic system according to a third embodiment of the present invention.

FIG. 5 illustrates the wide-angle zoom lens according to a third embodiment. Referring to FIG. 5, a first lens group 100-3 includes a first lens element 110-3 and a second lens element 120-3, a second lens group 200-3 includes first, second, third and fourth lens elements 210-3 to 240-3, and a third lens group 300-3 includes a lens element 310-3. Reference numeral 400-3 denotes an IR filter, and reference numeral 410-3 denotes a cover glass. Data of the lenses according to the third embodiment are as follows.

EFL: 4.36 mm~13.96 mm, FNo: 2.90~5.41, Viewing Angle: 85.9°~30.0°

Table 9 lists variable distances D1 to D4 at the wide-angle, middle-angle, and telephoto positions of the wide-angle zoom lens according to the third embodiment.

TABLE 9

|  | WIDE | MIDDLE | TELE |
|---|---|---|---|
| D1 | 12.488 | 3.806 | 0.935 |
| D2 | 4.441 | 11.042 | 17.224 |
| D3 | 3.346 | 2.862 | 2.680 |
| D4 | 0.370 | 0.370 | 0.370 |

Figure 6B:
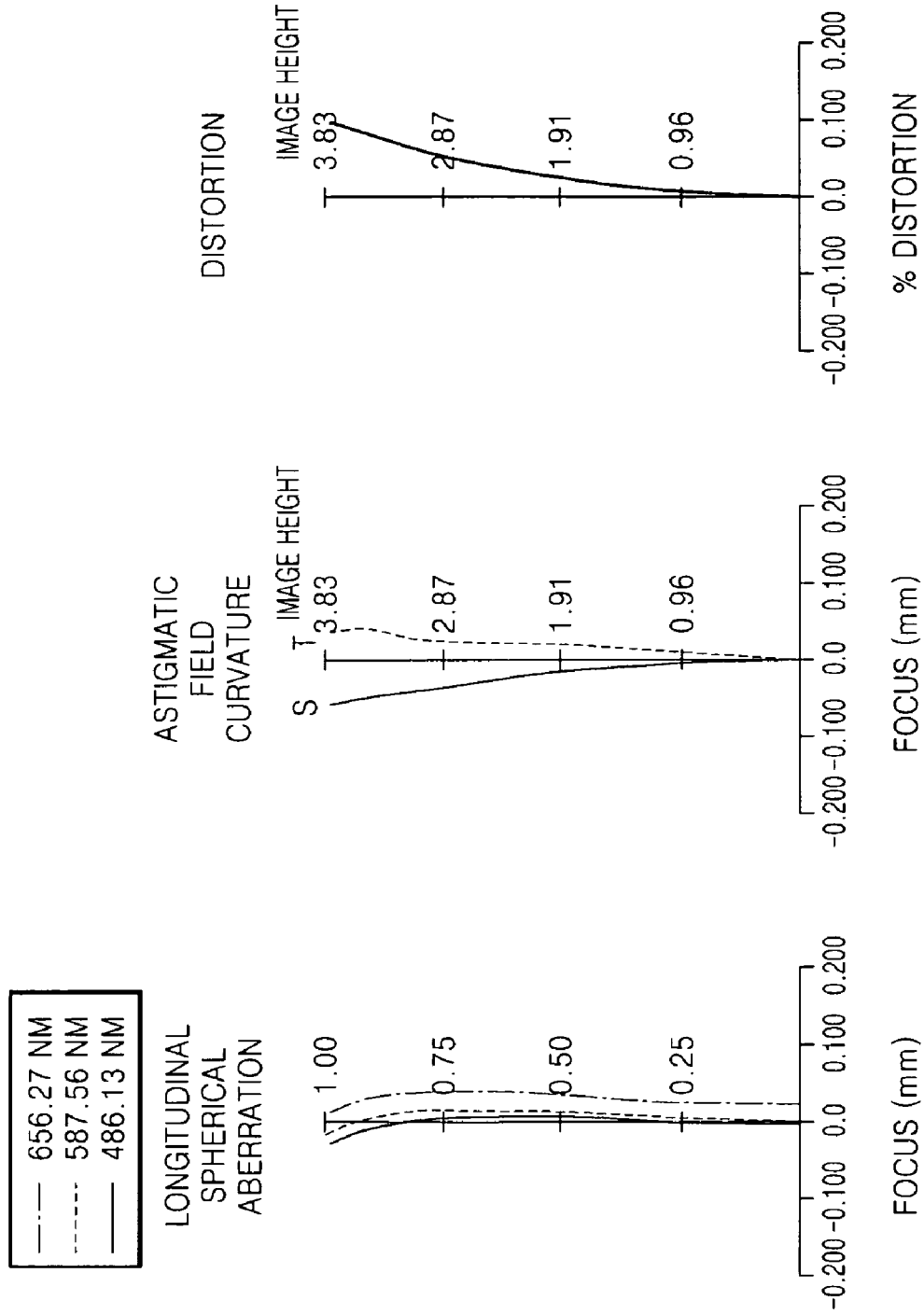

FIGS. 6A and 6B illustrate longitudinal spherical aberration, astigmatic field curvature, and distortion aberration at the wide-angle and telephoto positions of the wide-angle zoom lens according to the third embodiment. The longitudinal spherical aberration is measured by using light beams with wavelengths of 656.27 nm, 587.56 nm, and 486.13 nm.

The astigmatic field curvatures including tangential field curvatures T and sagittal field curvature S are measured by using the light beam with a wavelength of 587.56 nm. The distortion aberration is measured by using the light beam with a wavelength of 587.56 nm.

FOURTH EMBODIMENT

Figure 7:
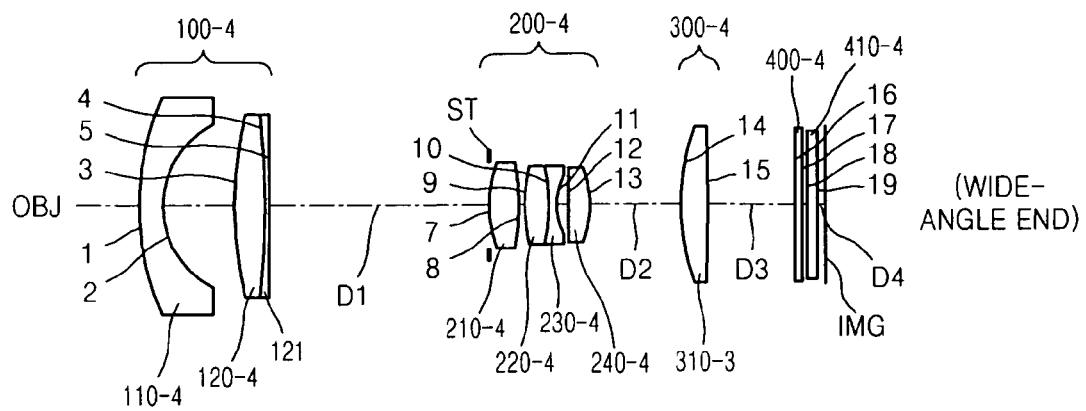
FIG. 7 illustrates optical layouts at wide-angle, middle-angle, and telephoto positions of a zoom optic system according to a fourth embodiment of the present invention.
Figure 7:
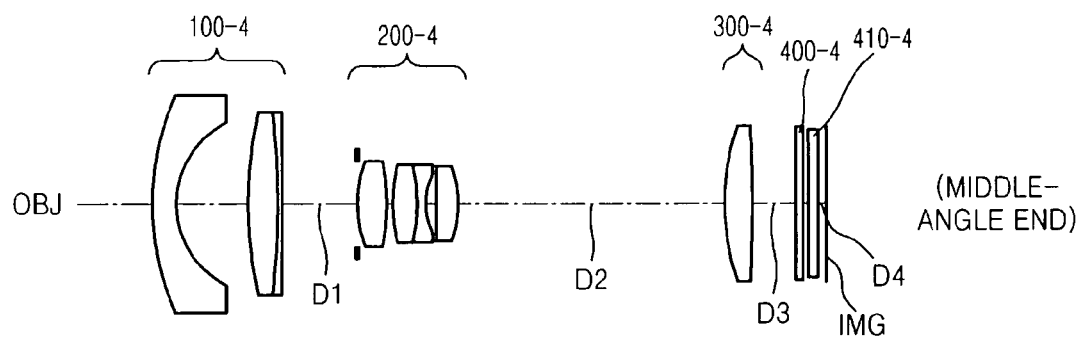
Figure 7:
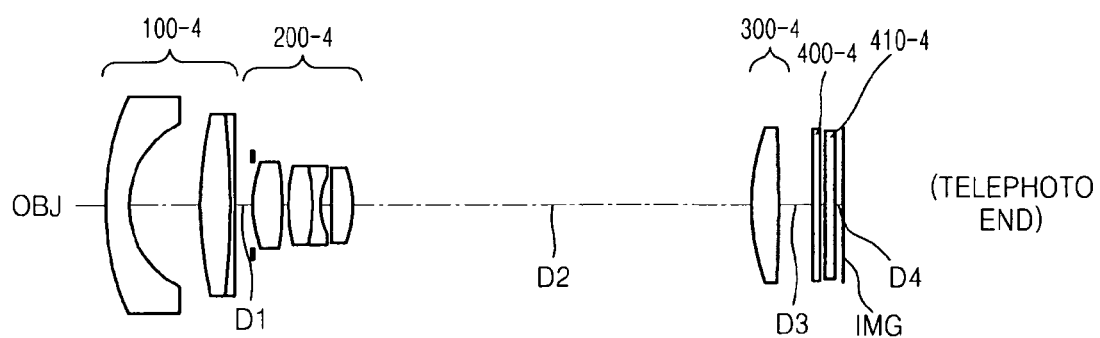

FIG. 7 illustrates the wide-angle zoom lens according to a fourth embodiment. Referring to FIG. 7, a first lens group 100-4 includes a first lens element 110-4 and a second lens element 120-4, a second lens group 200-4 includes first, second, third and fourth lens elements 210-4 to 240-4, and a third lens group 300-4 includes a lens element 310-4. Reference numeral 400-4 denotes an IR filter, and reference numeral 410-4 denotes a cover glass. The fourth embodiment is different from the aforementioned embodiments in that the first lens group 100-4 includes a hybrid lens element. The second lens element 120-4 is constructed as a hybrid lens. As an example of a method of forming the hybrid lens, the second lens element 120-4 is firstly formed as a spherical lens. Next, a thin liquid-state optical polymer layer 121 is coated on the spherical surface of the spherical lens. Subsequently, a curing process is performed so that the hybrid lens can be formed. Due to the hybrid lens, the cost of the zoom optic system can be reduced. Data of the lenses according to the second embodiment are as follows.

EFL: 5.15 mm~15.61 mm, FNo: 3.06~5.80, Viewing Angle: 76.2°~27.5°

TABLE 10

| Plane | Radius of Curvature | Thickness | Refractive Index ($N_d$) | Abbe's Number ($V_d$) |
|---|---|---|---|---|
| 1 | 11.866 | 1.000 | 1.801 | 45.5 |
| 2 | 3.994 | 3.630 | | |
| 3 | 24.062 | 1.346 | 1.923 | 19.7 |
| 4 | −215.942 | 0.030 | | |
| 5 | 26.047 | D1 | | |
| ST | infinity | 0.000 | | |
| 7 | 5.827 | 1.394 | 1.801 | 45.5 |
| 8 | −46.131 | 0.551 | | |
| 9 | 16.900 | 1.005 | 1.488 | 70.4 |
| 10 | −56.379 | 0.430 | 1.755 | 27.5 |
| 11 | 5.083 | 0.518 | | |
| 12 | −19.341 | 1.068 | 1.497 | 81.6 |
| 13 | −5.770 | D2 | | |
| 14 | 16.511 | 1.328 | 1.497 | 81.6 |
| 15 | −89.672 | D3 | | |
| 16 | infinity | 0.300 | 1.517 | 64.2 |
| 17 | infinity | 0.500 | | |
| 18 | infinity | 0.500 | 1.517 | 64.2 |
| 19 | infinity | D4 | | |

Table 11 lists aspherical coefficients of the zoom lenses according to the fourth embodiment.

TABLE 11

| Plane | K | A | B | C | D |
|---|---|---|---|---|---|
| 1 | −10.181347 | 4.954925E−04 | −1.052818E−05 | 4.148352E−08 | −1.391277E−10 |
| 2 | −1.259464 | 1.632970E−03 | 2.494411E−05 | 6.475950E−07 | −5.005632E−08 |
| 5 | −17.076728 | −5.371448E−04 | −1.181694E−05 | 2.045770E−07 | −1.302901E−08 |
| 7 | −0.632642 | 9.819296E−05 | 1.458701E−05 | 0.000000E+00 | 0.000000E+00 |
| 8 | −55.777124 | 6.295978E−04 | 5.697999E−06 | 0.000000E+00 | 0.000000E+00 |

Table 12 lists variable distances D1 to D4 at the wide-angle, middle-angle, and telephoto positions of the wide-angle zoom lens according to the fourth embodiment.

TABLE 12

| | WIDE | MIDDLE | TELE |
|---|---|---|---|
| D1 | 10.977 | 3.855 | 1.074 |
| D2 | 4.518 | 13.021 | 19.387 |
| D3 | 4.215 | 2.152 | 1.684 |
| D4 | 0.370 | 0.370 | 0.370 |

Figure 8A:
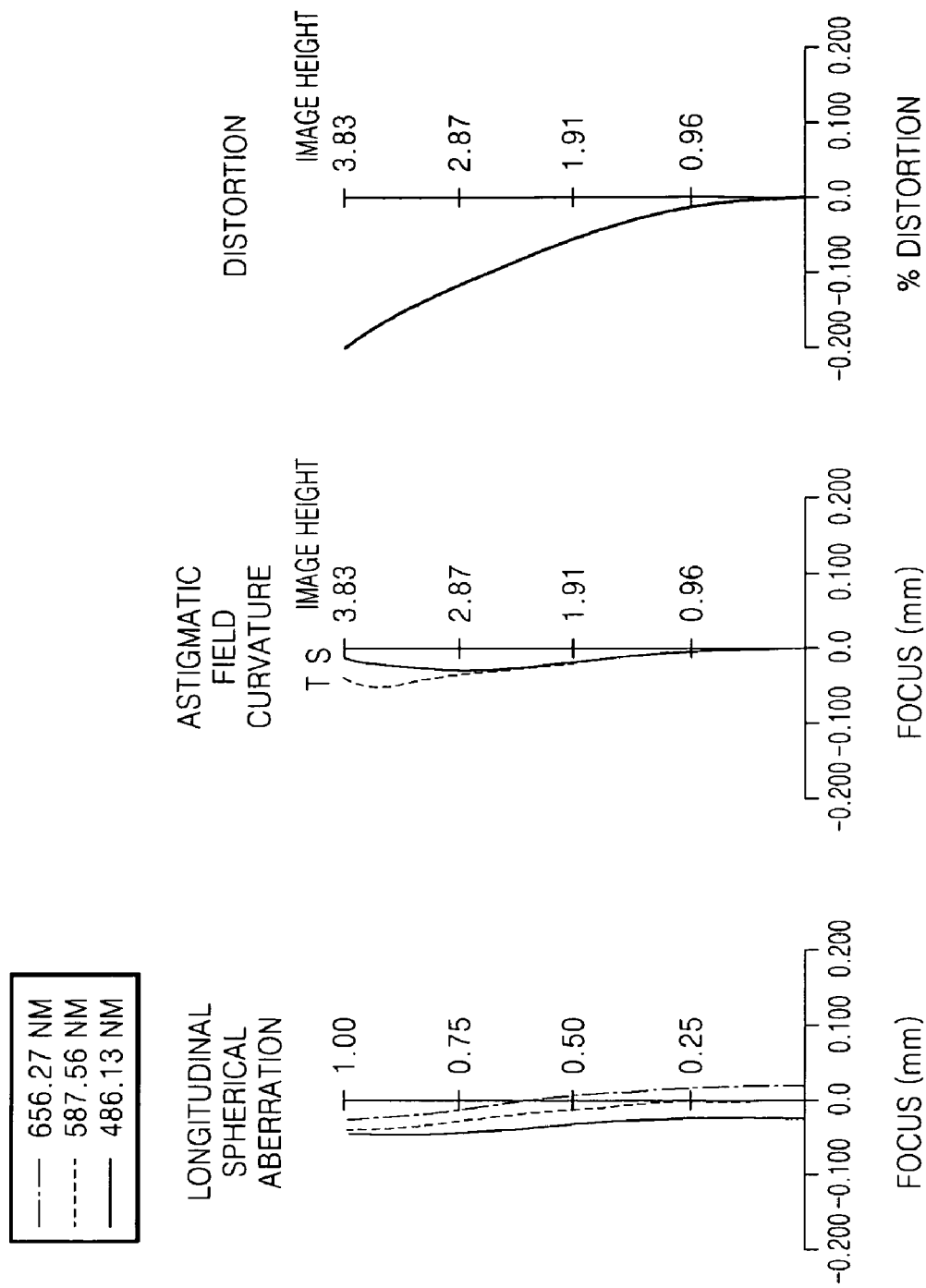

FIGS. 8A and 8B illustrate longitudinal spherical aberration, astigmatic field curvature, and distortion aberration at the wide-angle and telephoto positions of the wide-angle zoom lens according to the fourth embodiment. The longitudinal spherical aberration is measured by using light beams with wavelengths of 656.27 nm, 587.56 nm, and 486.13 nm. The astigmatic field curvatures including tangential field curvatures T and sagittal field curvature S are measured by using the light beam with a wavelength of 587.56 nm. The distortion aberration is measured by using the light beam with a wavelength of 587.56 nm.

Table 13 shows that the aforementioned embodiments satisfy Equations 1 to 5.

TABLE 13

| | First Embodiment | Second Embodiment | Third Embodiment | Fourth Embodiment |
|---|---|---|---|---|
| Equation 1 | 3.42 | 4.00 | 3.20 | 3.03 |
| Equation 2 | 1.33 | 1.60 | 1.10 | 1.10 |
| Equation 3 | 84.8 | 82.6 | 85.9 | 76.2 |
| Equation 4 | 1.997 | 1.995 | 1.959 | 1.923 |
| Equation 5 | 81.6 | 90.2 | 81.6 | 81.6 |

According to the present invention, it is possible to implement an inexpensive compact wide-angle zoom optic system having a small number of lenses and high optical performance such as a wide viewing angle and a high magnification. Accordingly, the wide-angle zoom optic system can be suitably used for image pickup apparatuses using a solid-state image pickup device such as CCD and CMOS, for example, in digital cameras and digital camcorders While the present invention has been particularly shown and described with reference to exemplary embodiments thereof, it will be understood by those of ordinary skill in the art that various changes in form and details may be made therein without departing from the spirit and scope of the present invention as defined by the appended claims.

What is claimed is:

1. A zoom optic system comprising, in an order from an object side:
a first lens group having a negative refractive power;
a second lens group having a positive refractive power; and a third lens group having a positive refractive power,
wherein the first lens group comprises two lens elements,
wherein the condition $1.1 \leq f_b/f_w \leq 1.6$ is satisfied, and
wherein $f_b$ is the distance between the last lens element in an order from the object side and the image surface at a wide-angle position, and $f_w$ is the focal length at the wide-angle position, and
wherein the second lens group comprises four lens elements having positive, positive, negative, and positive refractive power in the order from the object.

2. The zoom optic system of claim 1,
wherein the condition $3.0 \leq f_t/f_w \leq 4.0$ is satisfied, and
wherein $f_t$ is the focal length at the telephoto position.

3. The zoom optic system of claim 1, wherein the first lens group comprises a positive lens element disposed at the closest position to the image side among lenses of the first lens group has a refractive index $N_d$ satisfying the condition $N_d \leq 1.9$.

4. The zoom optic system of claim 1,
wherein the first lens group comprises two lens elements having negative and positive refractive power in the order from the object, and
wherein the two lens elements have an aspherical surface.

5. The zoom optic system of claim 1, wherein the second lens group comprises a cemented lens group formed by cementing a positive lens element and a negative lens element.

6. The zoom optic system of claim 1, wherein the second lens group includes at least one aspherical surface.

7. The zoom optic system of claim 6, comprising an iris diaphragm operating together with the second lens group,
wherein, among surfaces of lens elements constituting the second lens group, a surface adjacent to the iris diaphragm is an aspherical surface.

8. The zoom optic system of claim 1, wherein the second lens group comprises a shift lens group which can move in a direction perpendicular to the optical axis of the system.

9. The zoom optic system of claim 1, wherein the first lens group comprises a hybrid lens.

10. A zoom optic system comprising, in an order from an object side:
a first lens group having a negative refractive power;
a second lens group having a positive refractive power; and
a third lens group having a positive refractive power,
wherein the first lens group is comprised of two lens elements,
wherein the condition $76° \leq wfov \leq 86°$ is satisfied,
wherein wfov is the viewing angle at a wide-angle position,
wherein the condition $3.0 \leq f_t/f_w \leq 4.0$ is satisfied, and
wherein $f_t$ is a focal length at a telephoto position and $f_w$ is the focal length at the wide-angle position.

11. The zoom optic system of claim 10,
wherein the condition $1.1 \leq f_b/f_w \leq 1.6$ is satisfied, and
wherein $f_b$ is the distance between the last lens element in an order from the object side and an image surface at a wide-angle position, and $f_w$ is the focal length at the wide-angle position.

12. The zoom optic system of claim 10, wherein the second lens group includes at least one lens element having an Abbe value satisfying the condition $V_d \leq 80$.

13. The zoom optic system of claim 10, wherein the first lens group comprises a positive lens element disposed at the closest position to the image side among lenses of the first lens group has a refractive index $N_d$ satisfying the condition $N_d \leq 1.9$.

14. The zoom optic system of claim 10,
wherein the first lens group comprises two lens elements having negative and positive refractive power in the order from the object, and
wherein the two lens elements have an aspherical surface.

15. The zoom optic system of claim 10, wherein the second lens group comprises a cemented lens group formed by cementing a positive lens element and a negative lens element.

16. The zoom optic system of claim 10, wherein the second lens group includes at least one aspherical surface.

17. The zoom optic system of claim 16, further comprising an iris diaphragm operating together with the second lens group, and
wherein, the second lens group comprises a lens element with an aspherical surface adjacent to the iris diaphragm.

18. The zoom optic system of claim 10, wherein the second lens group comprises a shift lens group which can move in a direction perpendicular to the optical axis of the system.

19. The zoom optic system of claim 10, wherein the first lens group comprises a hybrid lens.

20. The zoom optic system of claim 10, wherein the second lens group comprises four lens elements having positive, positive, negative, and positive refractive power in the order from the object.

* * * * *

UNITED STATES PATENT AND TRADEMARK OFFICE
CERTIFICATE OF CORRECTION

PATENT NO. : 7,715,122 B2  Page 1 of 1
APPLICATION NO. : 12/217057
DATED : May 11, 2010
INVENTOR(S) : Jin-woo Kim It is certified that error appears in the above-identified patent and that said Letters Patent is hereby corrected as shown below:

In Claim 3, Column 11, line 18, replace "$N_d \leq 1.9$" with -- $N_d \geq 1.9$ --

In Claim 12, Column 12, line 14, replace "$V_d \leq 80$" with -- $V_d \geq 80$ --

In Claim 13, Column 12, line 19, replace "$N_d \leq 1.9$" with -- $N_d \geq 1.9$ --

Signed and Sealed this

Twenty-seventh Day of July, 2010

David J. Kappos
*Director of the United States Patent and Trademark Office*